United States Patent [19]

Lemme et al.

[11] Patent Number: 4,838,394
[45] Date of Patent: Jun. 13, 1989

[54] ADJUSTABLE SHOCK ABSORBER AND SYSTEM

[76] Inventors: Charles D. Lemme, 820 N. Igo Way, Tucson, Ariz. 85710; Fredrick J. Furrer, W12464 Boots Rd., Wisconsin Dells, Wis. 53965

[21] Appl. No.: 241,119

[22] Filed: Sep. 6, 1988

[51] Int. Cl.$^4$ .............................................. F16F 9/46
[52] U.S. Cl. .................................... 188/299; 188/282; 188/316; 188/322.14; 188/318; 188/314; 280/714; 280/840
[58] Field of Search ............... 188/299, 311, 314, 315, 188/316, 318, 317, 319, 322.14, 322.15, 322.21, 322.19, 322.13, 281, 282, 280, 285–286; 280/714, 707, 6 R, 6 H, 709; 267/64.16, 183, 186

[56] References Cited

U.S. PATENT DOCUMENTS

| | | | |
|---|---|---|---|
| 4,122,923 | 10/1978 | Ellis et al. | 188/285 |
| 4,164,274 | 8/1979 | Schupner | 188/285 |
| 4,566,718 | 1/1986 | Kanai et al. | 280/708 |
| 4,591,186 | 5/1986 | Ashiba | 280/707 |
| 4,600,215 | 7/1986 | Kuroki et al. | 280/707 |
| 4,620,619 | 11/1986 | Emura et al. | 188/319 |
| 4,647,069 | 3/1987 | Iijima | 188/299 X |
| 4,650,042 | 3/1987 | Knecht et al. | 280/707 |
| 4,753,328 | 6/1988 | Williams et al. | 188/299 |

Primary Examiner—Douglas C. Butler
Attorney, Agent, or Firm—Willian Brinks Olds Hofer Gilson & Lione Ltd.

[57] ABSTRACT

An adjustable shock absorber system includes a plurality of shock absorbers, the damping characteristics of which are controlled by a hydraulic control circuit. Each of the shock absorbers includes an adjustable flow restrictor that is controlled by a hydraulic actuator responsive to pressure in the control circuit. By adjusting pressure in the control circuit the damping characteristics of each of the shock absorbers can be adjusted in parallel.

34 Claims, 3 Drawing Sheets

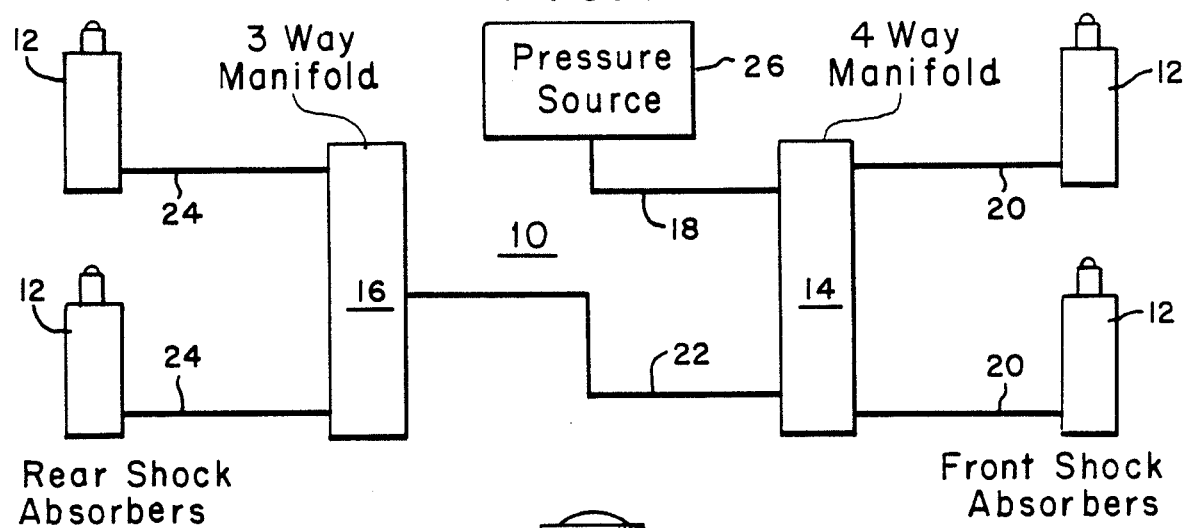
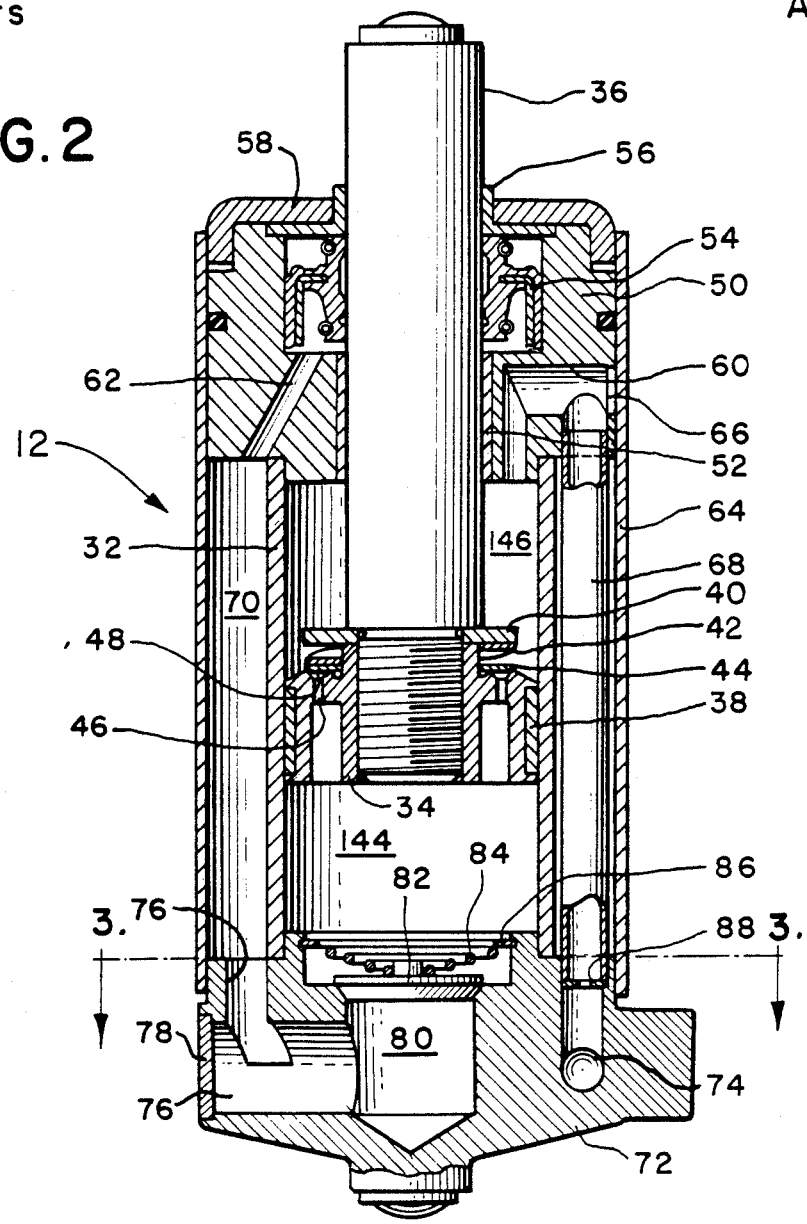

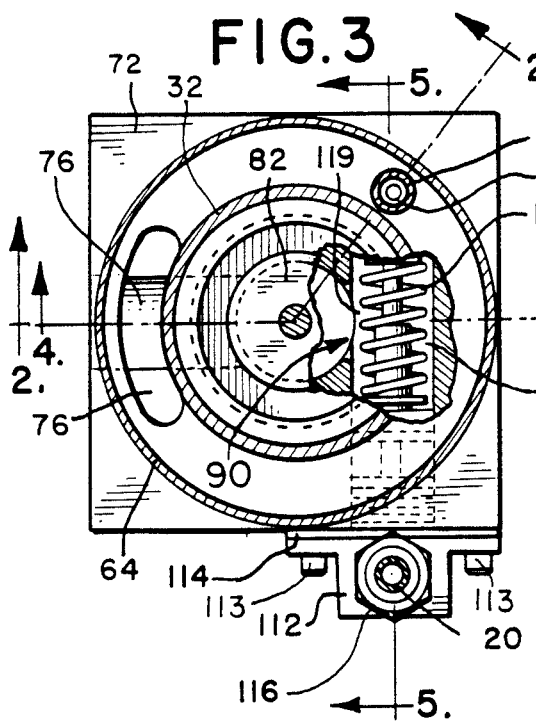
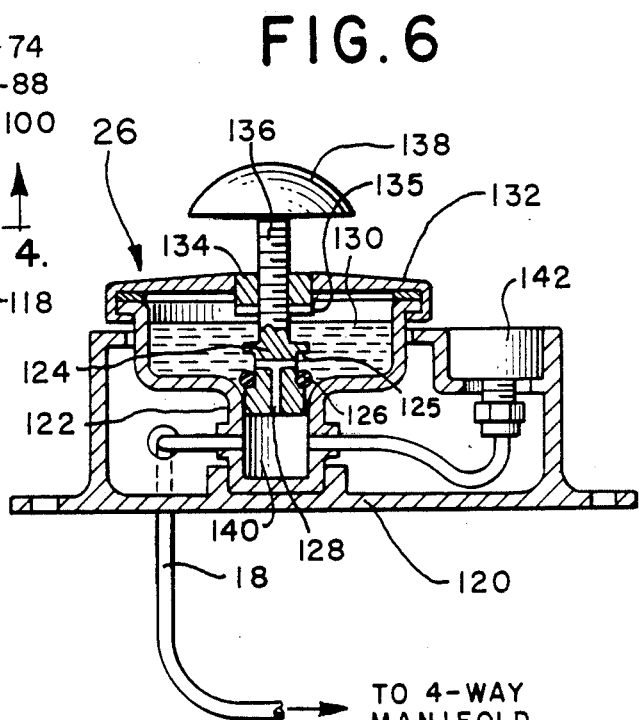
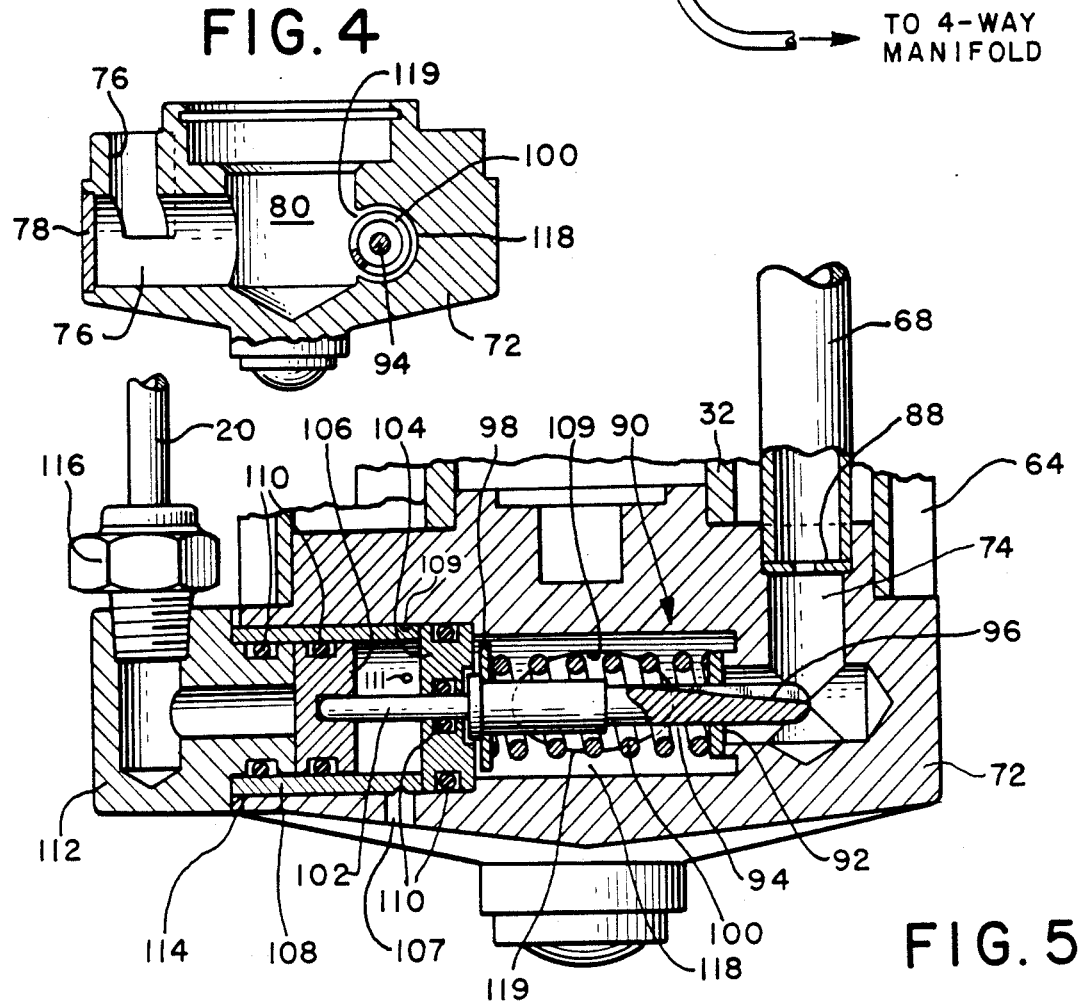

ADJUSTABLE SHOCK ABSORBER AND SYSTEM

BACKGROUND OF THE INVENTION

This invention relates to an adjustable shock absorber and system that allow remote adjustment of the force-velocity response of the shock absorber.

There is considerable interest in the automotive industry in a low cost reliable adjustable shock absorber that allows adjustment of its force-velocity response in accordance with either driver or automatic input signals. Knecht U.S. Pat. No. 4,650,042, Ashiba U.S. Pat. No. 4,519,186 and Emura U.S. Pat. No. 4,620,619 all disclose shock absorbers which utilize electrically powered actuators in the shock absorber to modify damping characteristics. Similarly Ellis U.S. Pat. No. 4,122,923 and Schupner U.S. Pat. No. 4,164,274 disclose adjustable shock absorbers having manually adjusted mechanical linkages to set the damping characteristics.

The above-identified prior art approaches use either electric motor or manually adjusted mechanical linkages to position valving elements at predetermined locations in the shock absorber. In many cases, such adjustable shock absorbers suffer from the need for a relatively expensive hollow piston rod. Furthermore, each unit must be made to close tolerances so that all the units on a given vehicle change in the same manner as the electric motors or mechanical linkages are adjusted.

Williams U.S. Pat. No. 4,753,328 discloses a shock absorber system in which pneumatic circuits are used to modify the effective length of the shock absorbers, not to change damping characteristics. In some ways. Williams is similar to Kuroki U.S. Pat. No. 4,600,215 and Kanai U.S. Pat. No. 4,566,718, both of which disclose conventional air spring systems in which pneumatic circuits are used to vary the characteristics of a plurality of air springs simultaneously.

The present invention is directed to an improved adjustable shock absorber and system which solve many of the problems of the prior art systems described above by eliminating the need for electric motor actuators or manually adjusted mechanical linkages to adjust the damping characteristics of the shock absorber.

SUMMARY OF THE INVENTION

According to this invention, an adjustable shock absorber for a vehicle comprises a cylinder, a piston disposed in the cylinder to define first and second chambers on opposite sides thereof and at least one passage interconnecting the first and second chambers such that movement of the piston in the cylinder in a selected direction forces a working hydraulic fluid from the first to the second chambers through the passage. Means are provided for adjustably controlling fluid flow restriction characteristics of the passage to determine a damping characteristic of the shock absorber, and a fluid powered actuator means is coupled to the controlling means and configured to be connected to a control fluid circuit to adjust the controlling means and therefore the damping characteristic of the shock absorber in response to pressure of the control fluid circuit.

In the preferred embodiments described below the fluid powered actuator means comprises an actuator piston operated by a hydraulic control circuit, and the means for adjustably controlling fluid flow restriction characteristics comprises a tapered passage flow restriction valve and a blow off valve coupled to the actuator piston. The actuator piston moves in response to pressure of the control fluid circuit, and the actuator piston position determines the bias force applied to seat the blow off valve and the position of the tapered passage metering valve.

The improved shock absorber of this invention can be used in an improved shock absorber system in which a plurality of shock absorbers of the type described above are connected to the control fluid circuit. In this system, means are provided for adjusting control fluid pressure in the control fluid circuit in order to cause each of the fluid powered actuators to adjust the respective flow controlling means, thereby varying the damping characteristics of each of the shock absorbers in parallel.

This system provides the important advantage that the control fluid circuit automatically applies the same pressure to all of the actuators of all of the shock absorbers. This result follows from the nature of control fluid circuits in which Pascal's Law applies. In a properly configured system, all of the shock absorbers can be adjusted to provide the same damping characteristics by the relatively simple step of adjusting the pressure of the control fluid in the control circuit to the appropriate level. In this way, the need for electric actuators and dimensionally matched springs is substantially eliminated or reduced, thereby providing a particularly cost effective system.

The invention itself together with further objects and attendant advantages, will best be understood by reference to the following detailed description taken in conjunction with the accompanying drawings

BRIEF DESCRIPTION OF THE DRAWINGS

FIG. 1 is a schematic view of a shock absorber system which incorporates a presently preferred embodiment of this invention.

FIG. 2 is a cross sectional view of one of the shock absorbers of FIG. 1 taken along line 2—2 of FIG. 3.

FIG. 3 is a cross sectional view taken along line 3—3 of FIG. 2.

FIG. 4 is a cross sectional view taken along line 4—4 of FIG. 3.

FIG. 5 is a cross sectional view taken along line 5—5 of FIG. 3.

FIG. 6 is a cross sectional view of the pressure source of FIG. 1.

DETAILED DESCRIPTION OF THE PRESENTLY PREFERRED EMBODIMENTS

Figure 7:
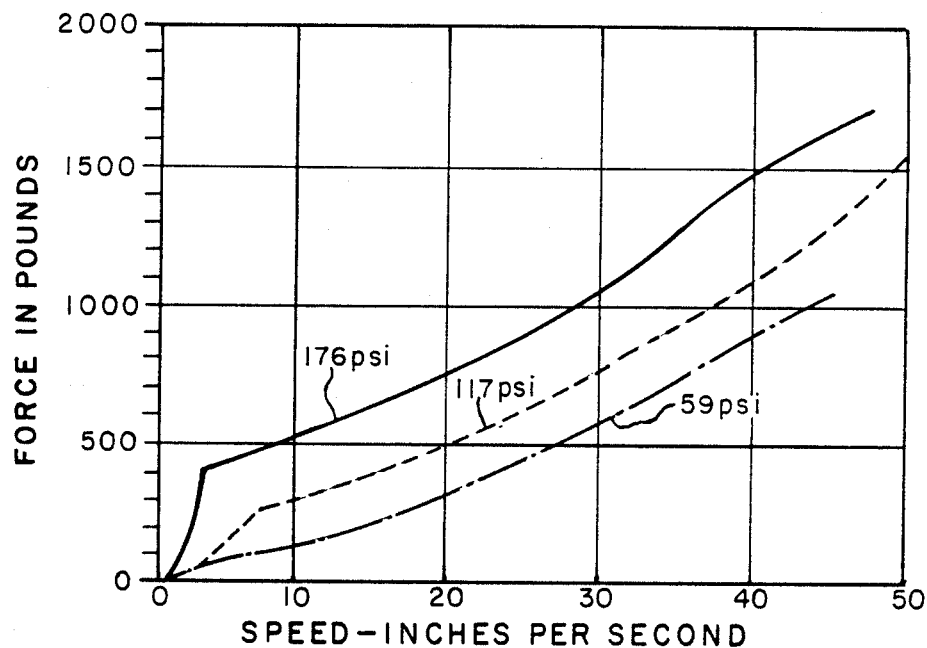
FIG. 7 is a graph showing the adjustable relationship between force and velocity during recoil of the shock absorber of FIG. 2.

Turning now to the drawings FIG. 1 shows a system 10 which incorporates a presently preferred embodiment of this invention. The system 10 includes four adjustable shock absorbers 12 and a control fluid pressure source 26. Typically, the four shock absorbers 12 will include two shock absorbers mounted to the front suspension elements of the vehicle, and two shock absorbers mounted to the rear suspension elements of the vehicle. In this embodiment the pressure source 26 is mounted on the center console of the vehicle so as to be accessible by the driver for manual adjustment. The pressure source 26 supplies a pressurized control fluid such as hydraulic fluid to a four-way manifold 14 which is connected to the front shock absorbers 12 by hydraulic lines 20 and to a three-way manifold 16 by a hydraulic line 22. The three-way manifold 16 is in turn connected to the two rear shock absorbers 12 by hydraulic lines 24. Typically the four-way manifold 14 can be mounted in the engine compartment forward of the firewall of the vehicle.

In this exemplary system the four shock absorbers 12 are identical. For purposes of illustration one of the front shock absorbers 12 is shown in FIGS. 2-5.

As shown in FIG. 2, the shock absorber 12 includes an inner cylinder 32 which slidingly receives a piston 34. The piston 34 is threadedly connected to a piston rod 36, and the piston 34 defines a wear band 38 that forms a sliding seal against the inner wall of the inner cylinder 32. A plate 40 is mounted between the piston 34 and the piston rod 36, and this plate 40 performs two separate functions: it defines a piston stop that limits axial movement of the piston 34 in the inner cylinder 32, and it positions an annular bypass spring 42, which may for example be a wave washer. The bypass spring 42 biases a bypass valve plate 44 to a sealing position. The piston 34 forms an array of bypass passages 46 which communicate at their upper end with an annular groove 48. The bypass valve plate 44 forms a check valve which imposes little restriction against fluid moving upwardly through the bypass passages 46, but which prevents reverse flow.

The upper and lower ends of the inner cylinder 32 are sealed by an inner cylinder head 50 and a base 72, respectively. The inner cylinder head 50 supports a bearing 52 which guides axial motion of the piston rod 36. In addition a rod seal 54 is mounted within a cavity in the inner cylinder head 50, and the rod seal 54 forms a fluid-tight hydraulic seal against the piston rod 36. Dirt and other contamination is prevented from entering the shock absorber by a rod scraper 56 mounted around the piston rod 36 at the upper end of the inner cylinder head 50. The rod scraper 56 is held in place by a head cap 58, and the inner cylinder head 50 defines two passages 60, 62 which will be discussed below.

A reservoir cylinder 64 is mounted concentrically around the inner cylinder 32. The reservoir cylinder 64 has a slip fit over the inner cylinder head 50 and is welded to the base 72 at its lower end and to the head cap 58 at its upper end.

A down tube 68 is mounted between the base 72 and the inner cylinder head 50, and the down tube 68 is in fluid communication with the passage 60. A plug 66 seals a portion of the passage 60 adjacent the reservoir cylinder 64. The space between the reservoir cylinder 64 and the inner cylinder 32 forms a reservoir 70 which serves as a storage volume for the working hydraulic fluid of the shock absorber. The diagonal passage 62 allows hydraulic fluid that has leaked past the bearing 52 around the piston rod 36 to flow back to the reservoir 70.

The base 72 is shown in detail in FIGS. 3-5. Generally speaking, the base 72 defines a passage 4 that receives hydraulic fluid from the down tube 68, a central passage 80, and a passage 76 which extends between the central passage 80 and the reservoir 70. A plug 78 seals a portion of the passage 76 as shown in FIG. 4. A valve chamber 118 is in fluid communication with both the passage 74 and the central passage 80.

As best shown in FIG. 2, a replenishing valve 82 operates as a check valve to restrict flow through the valve 82 to one direction into the inner cylinder 32. This replenishing valve 82 is biased to its closed position by a compression spring 84 which is held in place by a retainer 86. A restrictor plate 88 is positioned at the bottom of the down tube 68 between the down tube 68 and the passage 74.

As best shown in FIG. 5, an adjustable flow restrictor 90 is positioned inside the base 72 in a valve chamber 118. This valve chamber 118 is in unrestricted fluid communication with the central passage 80 via a window 119, and is in restricted fluid communication with the passage 74 via a valve plate 92 and a valve pin 94. The valve pin 94 includes a cylindrical outer end which defines a tapered slot 96. The valve pin 94 fits in a close sliding fit within a central aperture in the valve plate 92. Because of the tapered slot 96, the low speed flow resistance to fluid passing from the passage 74 to the valve chamber 118 is determined by the axial position of the valve pin 94 and therefore the portion of the tapered slot 96 aligned with the valve plate 92.

A retainer 98 is mounted at a central portion of the valve pin 94, and a compression coil spring 100 extends between the retainer 98 and the valve plate 92. This spring 100 biases the valve plate 92 to the closed position shown in FIG. 5. When the fluid pressure tending to unseat the valve plate 92 exceeds the seating force supplied by the spring 100, the valve plate 92 moves axially to reduce restricting forces on fluid flow from the passage 74 to the valve chamber 118. Thus, the valve plate 92 and the spring 100 function as a blow off valve, in which the pressure required to open the blow off valve is determined by the force applied by the spring 100.

The rear portion of the valve pnn 94 defines a guide shaft 102 that passes through a guide 104 fixedly mounted in position in the base 72. The extreme end of the guide shaft 102 fits in a socket in an actuating piston 106 that is slidably mounted in a cylinder defined by a sleeve 108. O-rings 110 are provided as shown in FIG. 5 to prevent or minimize fluid leakage. The adjustable flow restrictor 90 includes the valve pin 94, the piston 106, the guide 104 and the sleeve 108, as well as components mounted thereon.

An adapter 112 is secured in place to the base 72 by screws 113, and this adapter 112 serves to mount a fitting 116 coupled to one end of one of the hydraulic lines 20. The adapter 112 bears on one end of the sleeve 108, which in turn bears on the guide 104 and secures the guide 104 in place. The cylinder defined by the sleeve 108 is vented by a bore 107 which communicates with an outer circumferential groove 109 and a through hole 111 in the sleeve 108 to prevent the pressure of fluid in the reservoir 70 from acting on the piston 106 (other than through the small area of the guide shaft 102). A washer 114 can be positioned around the sleeve 108 to reduce contamination and corrosion between the adapter 112 and the base 72.

Hydraulic pressure in the hydraulic line 20 causes the actuator piston 106 to move in the sleeve 108, thereby moving the valve pin 94 axially. This simultaneously (1) adjusts the position of the tapered slot 96 to adjust the size of the low velocity metering orifice of the flow restrictor 90, and (2) compresses the coil spring 100 to set the force tending to hold the valve plate 92 in the seated position.

As shown in FIG. 6, the pressure source 26 in this embodiment is a manually operated piston pump which includes a housing 120 that supports a cylinder 122. A piston 124 is slidable in the cylinder 122, and this piston 124 mounts an O-ring 126 in a groove 125. When the piston 124 is lowered and the O-ring 126 is positioned in an upper part of the groove 125, a seal is created between the piston 124 and the cylinder 122. When the piston 124 is raised and the pressure in the volume 140 falls below zero gauge, the O-ring 126 moves to a lower part of the groove 125 and fluid communication is provided between the pressurized volume 140 beneath the piston 124 and a reservoir volume 130 above the piston 124 by means of bores 128 formed in the piston 124. This allows hydraulic fluid to flow from the reservoir 130 to the pressurized volume 140 to replenish any leakage. A reservoir cover 132 covers the reservoir 130, and this reservoir cover 132 mounts a brass nut 134 that receives a threaded shaft 136. This threaded shaft 136 is secured to the piston 124 at its lower end and to a manually adjustable knob 138 at its upper end. A suitable low pressure seal such as a felt washer 135 seals against leakage of hydraulic fluid out of the reservoir 130 along the shaft 136. A pressure gauge 142 s in fluid communication with the pressurized volume 140 so as to indicate the pressure of the hydraulic fluid supplied by the pressure source 26 to the four-way manifold 14 via the hydraulic line 18. The pressure gauge 142 can be marked with three pressure ranges: Soft, Medium, Firm.

Of course, many variations are possible. For example, the threaded shaft 136 may be sized larger than the piston 124 to allow the shaft 136 and piston 124 to be removed from the top of the nut 134. The opening in the nut 134 can then be used to add hydraulic fluid to the reservoir 130. Also, the threaded shaft 136 may be formed as a hollow tube and the gauge 142 may be mounted at the top of the threaded shaft in the knob 138.

The shock absorber 12 of FIG. 2 can be assembled initially with all parts as shown except for the reservoir cylinder 64 and the flow restrictor 90. This allows free access to the down tube 68 which must be fitted into both the inner cylinder head 50 and the base 72. The reservoir cylinder 64 is then slid onto the shock absorber from the top and welded at both ends, while an axial load is applied between the base 72 and the head cap 58. Damping oil is then filled through the valve hole of the base, and the valve assembly including the adjustable flow restrictor 90 is then assembled. When the system 10 is installed on a vehicle, the control circuit comprising the pressure source 26, the manifolds 14, 16 and the hydraulic lines 18, 20, 22 and 24 should be bled to remove air.

Simply by way of example, the following details of construction have been found to function properly in the embodiment described above. The valve spring 100 has a maximum installed force of 26 lbs and a spring rate of 165 lbs per inch. The actuator piston 106 has a diameter of 11 mm. To achieve the full 26 lbs of force on the spring 100 a pressure of about 180 psi is required in the hydraulic control circuit. This pressure is easily obtained with a manual pressure source 26 such as that described above.

The following table identifies other components that have been found suitable for the shock absorber 12:

| Ref. No. | Description | Identification |
| --- | --- | --- |
| 34 | Piston | Sintered iron with added copper for improved bearing properties |
| 38 | Wear band | Suitable bearing material |

| Ref. No. | Description | Identification |
| --- | --- | --- |
| | | such as bronze impregnated Teflon TM |
| 52 | Bearing | Garlock DU Bearing TM |
| 54 | Rod seal | Conventional McPhearson strut seal |
| 56 | Rod scraper | Dimensionally stable plastic such as nylon or Delrin TM |
| 18–24 | Hydraulic Line | Parker 4 mm nylon tubing |
| 116 | Fitting | Parker Prestolok TM fitting |

Of course, many alternative materials and components may be used. For example an O-ring seal of a durable material such as polyurethane can be mounted on the piston 34 to provide a better seal against the inner cylinder 32. In some lower cost versions the bearing 52 can be eliminated and the inner cylinder head 50 formed of a bearing material such as sintered iron with copper. If the shock absorber is to be gas pressurized or a lower cost rod seal is required, the rod seal 54 may be replaced with a molded rubber bushing having multiple lips pointed towards the interior of the shock absorber.

OPERATION

This arrangement allows the standard three areas of force to be used in designing the force-velocity curve. These three areas are as follows: (1) the low speed leak region (often called the orifice region) which occurs at low fluid velocities before the valve plate 92 lifts: (2) the blow off pressure which is defined as the pressure at which the valve plate 92 begins to open and then maintains a fairly constant pressure drop across the valve plate 92 due to spring deflection: (3) the high velocity flow region in which the flow restriction of the restrictor plate 88 becomes significant. By using the pressure source 26 to adjust the positions of the pistons 106 in the shock absorbers 12, the force biasing the valve plate 92 into the closed position and the position of the tapered slot 96 with respect to the valve plate 92 can both be modified. This allows adjustment to both the blow off pressure and the low speed orifice leakage rate.

One advantageous feature of operation of the shock absorber 12 is that the principal flow restriction for hydraulic fluid during both compression and elongation of the shock absorber 12 is provided by the adjustable flow restrictor 90 and the flow restrictor plate 88. On shock absorber recoil (or elongation). the annular volume in the upper chamber 146 above the piston 34 (determined by the ID of the inner cylinder 32 and the OD of the piston rod 36) flows through the passage 60, the down tube 68, the flow restrictors 88. 90 and the central passage 80 to the lower chamber 144. On shock absorber compression (or shortening) the rod displacement oil flows through these same passages and flow restrictors to the reservoir 70. The replenishing valve 82 is much larger in the shock absorber of FIG. 2 than for conventional shock absorbers because full piston displacement must be replenished on each recoil stroke.

Thus, for both compression and recoil strokes the resistance to fluid flow is determined principally by the position of the piston 106, because the position of the piston 106 determines the force applied to the valve plate 92 by the spring 100 and the position of the tapered slot 96. In this way the hydraulic pressure in the control circuit determines both the blow off pressure of the blow off valve that includes the valve plate 92 and the low speed leakage rate provided by the tapered slot 96.

Figure 8:
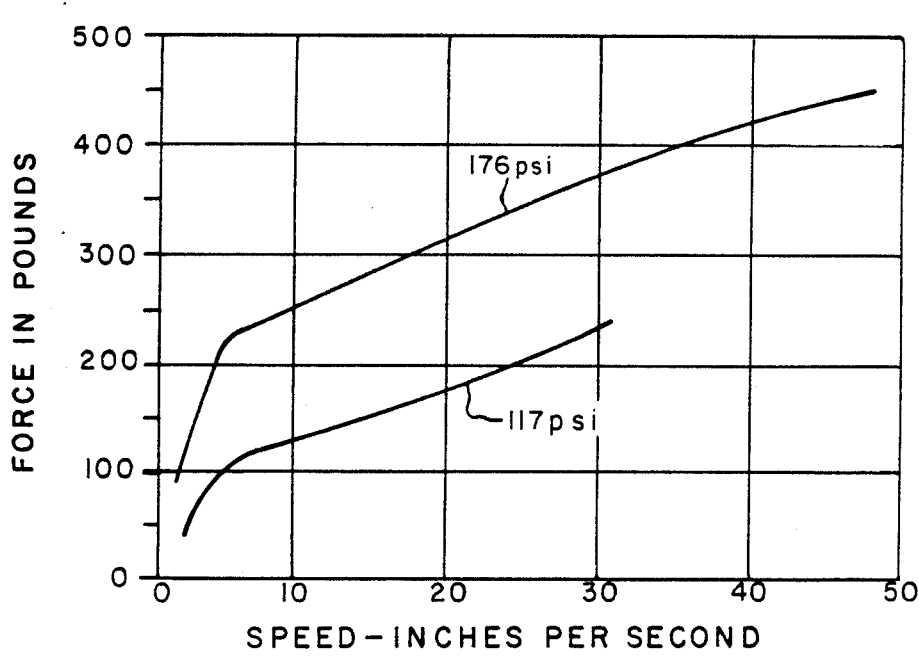
FIG. 8 is a graph showing the adjustable relationship between force and velocity during compression in the shock absorber of FIG. 2.

FIGS. 7 and 8 are graphs showing recoil and compression forces generated by one of the shock absorbers 12 as a function of axial speed of the piston rod 36 with respect to the inner cylinder 32. These curves show the manner in which the slope may be adjusted in the low speed orifice leakage region of the curve, and the manner in which the blow off pressure can be adjusted In FIGS. 7 and 8 the curves are labeled with the corresponding control fluid pressure.

Compression forces can additionally be varied from one unit to the next by changing the force of the bypass spring 42 and the size of the bypass passages 46 in the piston 34. However any force developed by flow through the piston 34 is fixed in this design by the selected components and cannot be varied once the unit is assembled. Secondarily, orifice slots can be coined into the seats for the replenishing valve 82 and the valve plate 44 if necessary to tailor the shock absorber 12 to a particular application.

The primary ratio of adjustable compression forces to adjustable recoil forces developed by the shock absorber 12 is fixed by the area ratio of the piston rod 36 to the annulus above the piston 34. Primary recoil forces are determined by the restrictor plate 88 and the adjustable flow restrictor 90 in the base 72. Primary compression forces are determined by the same components plus the restriction provided by the bypass passages 46 and the bypass valve plate 44 described above.

The diameter and therefore the area, of each of the actuator pistons 106 can be accurately determined. The force tolerance for coil springs set to a fixed dimension is much more difficult to control than is the area of the piston 106. Spring dimensions, such as number of coils, free height, wire diameter and mean diameter, all affect the installed spring force, and some of these dimensions are raised to the second or third power so that the resulting force is highly dependent on even small dimensional changes. Many prior art shock absorbers rely on the dimensional size of the spring cavity to determine the force developed by the spring. This causes forces applied to the valve plate by the spring to vary significantly from unit to unit.

In contrast, in the preferred embodiment described above all forces on the valve plate 92 can be made closely equal to one another except for very small variations due to tolerances in the internal diameters of the sleeves 108 surrounding the piston 106. This tolerance can easily and inexpensively be maintained to within plus or minus 0.02 mm on an 11 mm bore diameter. This degree of precision translates to an area variation of only plus or minus 0.4%. Relatively expensive sorting is required to produce springs that are matched to plus or minus 5%, and cavity dimensional tolerances must be added to this value.

Thus, the embodiment described above provides excellent uniformity among all four shock absorbers 12 at relatively low cost, without requiring expensive sorting of springs to close tolerances. Squared and ground springs of ordinary tolerances are acceptable. Regardless of changes in dimensions of the spring 100 and its cavity the hydraulic control system including the pressure source 26 ensures that at any given time a constant pressure and therefore a constant force is applied to the pistons 106 and therefore to the valve plates 92.

Another important advantage of the shock absorber system 10 described above is that the individual shock absorbers 12 interact with one another to improve the overall damping characteristics of the system. In general, a firmer suspension is preferred for rough terrain. Such rough terrain will result in increased flows and pressures in any individual one of the shock absorbers in passage 74 which results in an axial force on pin 94 which in turn urges piston 106 outward. This increases the pressure in the control circuit. The axial force on the pin 94 is further increased when the valve plate 92 opens. This increases the compression of the spring 100 and therefore the force applied to the piston 106 tending to raise the pressure of hydraulic fluid in the line 20 and therefore in the entire control circuit. This increased control circuit pressure automatically adjusts the other shock absorbers 12 to a higher blow off pressure and a more restrictive low speed leakage orifice. i.e. a firmer suspension. For example, if one wheel hits a hole or a bump, the dampening of the other three wheels is increased to minimize the pitch and roll effects of the input to the first wheel.

The shock absorber 12 also provides failsafe operation in the event of a failure of the control circuit. Positive stops are provided at both extremes of travel of the piston 106, and unexpectedly high or low pressures in the control circuit cannot move the piston outside of the preselected range of travel.

The pressure source 26 described above is one relatively simple, manually operated pressure source However, this invention is not limited to use with any particular pressure source. For example, one slightly more sophisticated system taps pressurized hydraulic fluid from the power steering pump of the vehicle via an adjustable pressure reducing valve. The adjustable pressure reducing valve can be controlled either by the operator or by an automatic control system in the vehicle that takes into account vehicle parameters such as speed, gear selection and road roughness. Such an automatic control system can respond to vehicle acceleration/deceleration to prevent the front end of the vehicle from diving on deceleration, or the rear end of the vehicle from squatting on acceleration.

The pressure source 26 is not limited to use with hydraulic fluids, but can also be operated pneumatically with an air over oil system in which the two fluids are separated by a flexible diaphragm. Air pressure can be regulated to an adjustable value, with the oil in an equilibrium pressure with the air. The pressures required are well within the values that can be achieved with simple air compressors. Alternately the entire control circuit can be pneumatic.

A third alternative source of fluid pressure is the shock absorber itself. It is a simple matter to install a pressure tap in the base of one master shock absorber with a check valve in the line. This line can be connected to a pressurized storage volume such as a gas charged accumulator. The pressure required to operate the control system is less than 200 psi, and shock absorber pressures are typically well above this value. In this proposed alternative system whenever pressure in the passage 74 is above the desired storage pressure, hydraulic fluid flows to the pressurized storage volume. Hydraulic fluid is bled out of the pressurized storage volume to the control circuit whenever damping forces on the shock absorbers 12 need to be increased. Hydraulic fluid is bled off from the control system back to the reservoir 70 of the master shock absorber from which it came whenever damping levels of the shock absorbers need to be reduced.

Furthermore, it is not required in all embodiments that all four shock absorbers 12 be controlled by the same control system For example, two separate control systems can be provided, each with its own pressure source 26 to allow the driver to control the front shock absorbers separately from the rear shock absorbers.

This invention is also not restricted to the particular form of shock absorbers shown. A number of variations are possible to the design described above. For example, the adjustable flow restrictor 90 can be mounted in the piston 34 and controlled via a control circuit fluid path that extends axially through the piston rod 36. One advantage of this alternative is that it moves the adjustable flow restrictor 90 out of the base 72, where it may be inaccessible. Alternately, the adjustable flow restrictor may also adjust the size of the opening in the restrictor plate 88. Furthermore, this invention is not limited to use with fluid powered actuators such as the piston 106. Rather then types of fluid powered actuators such as bellows, diaphragms and the like can be substituted in alternative embodiments.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents which are intended to define the scope of this invention.

We claim:

1. An adjustable hydraulic shock absorber system comprising:
   a plurality of shock absorbers, each operative to pass fluid through a respective passage in response to at least one of elongation and shortening of the shock absorber, each shock absorber comprising means for adjustably controlling at least one fluid flow restriction characteristic of the passage;
   a plurality of fluid powered actuator means, each coupled to a respective one of the controlling means, for adjusting the respective controlling means in response to a control fluid pressure;
   a control fluid circuit interconnecting each of the actuator means to supply a control fluid to each of the actuator means; and
   means for adjusting control fluid pressure in the control fluid circuit in order to cause the fluid powered actuator means to adjust each of the controlling means, thereby varying at least one damping characteristic of the shock absorbers in parallel.

2. The invention of claim 1 wherein each of the fluid powered actuator means comprises a respective actuator piston.

3. The invention of claim 2 wherein each of the controlling means comprises a flow metering valve member secured to the respective actuator piston to move with the respective actuator piston.

4. The invention of claim 2 wherein each of the controlling means comprises:
   a blow off valve; and
   a compression spring interposed between the blow off valve and the respective actuator piston such that the spring provides a biasing force tending to seat the blow off valve and the biasing force is variable as a function of the position of the actuator piston.

5. The invention of claim 1 wherein the pressure adjusting means comprises:
   a cylinder in fluid communication with the control circuit;
   a piston disposed in the cylinder; and
   a manually controllable positioning system coupled to the piston to position the piston in the cylinder.

6. The invention of claim 1 wherein each of the shock absorbers is operative to pass fluid through the respective passage in the same flow direction in response to both elongation and shortening of the shock absorber.

7. The invention of claim 6 wherein each shock absorber defines a principal flow restriction at the controlling means during both elongation and shortening of the shock absorber.

8. An adjustable shock absorber system for a vehicle suspension system, said shock absorber system comprising:
   a control circuit adapted to contain a control fluid:
   a plurality of hydraulic shock absorbers adapted for mounting in the vehicle suspension system, each of said shock absorbers comprising:
   a cylinder;
   a piston disposed in the cylinder to define first and second chambers on opposite sides thereof:
   at least one passage interconnecting the first and second chambers such that movement of the piston in the cylinder in a selected direction forces a working hydraulic fluid from the first to the second chambers through the passage;
   an adjustable valve disposed in the passage and effective to restrict fluid flow through the passage to determine a damping characteristic of the shock absorber;
   a fluid powered actuator responsive to fluid pressure in the control circuit and coupled to the adjustable valve, said actuator effective to adjust the valve and therefore the damping characteristic of the shock absorber in response to fluid pressure of the control circuit; and
   a pressure source coupled to the control circuit to pressurize the control fluid in the control circuit to a selected value, thereby causing the actuators to adjust the valves of the shock absorbers in parallel.

9. An adjustable shock absorber system for a vehicle suspension system, said shock absorber system comprising:
   a control circuit adapted to contain a control fluid;
   a plurality of hydraulic shock absorbers adapted for mounting in the vehicle suspension system, each of said shock absorbers comprising:
   a cylinder;
   a piston disposed in the cylinder to define first and second chambers on opposite sides thereof;
   a reservoir;
   at least one passage interconnecting the first and second chambers and the reservoir such that movement of the piston in the cylinder in a selected direction forces a working hydraulic fluid from the first chamber through the passage to at least one of the reservoir and the second chamber;
   an adjustable valve disposed in the passage and effective to restrict fluid flow through the passage to determine a damping characteristic of the shock absorber;
   a fluid powered actuator responsive to fluid pressure in the control circuit and coupled to the adjustable valve, said actuator effective to adjust the valve and therefore the damping characteristic of the shock absorber in response to fluid pressure of the control circuit and a pressure source coupled to the control circuit to pressurize the control fluid in the control circuit to a selected value thereby causing the actuators to adjust the valves of the shock absorbers in parallel.

10. The invention of claim 8 or 9 wherein each of the actuators comprises a respective actuator element movably mounted to respond to fluid pressure in the control circuit.

11. The invention of claim 10 wherein each of the valves comprises a tapered passage flow metering element secured to the respective actuator element to move with the actuator element.

12. The invention of claim 10 wherein each of the valves comprises:

a blow off valve: and a compression spring interposed between the blow off valve and the respective actuator element such that the spring provides a biasing force tending to seat the blow off valve and the biasing force is variable as a function of the position of the actuator element.

13. The invention of claim 8 or 9 wherein the pressure source comprises:

a pressure source cylinder in fluid communication with the control circuit;

a pressure source piston disposed in the pressure source cylinder and a manually controllable positioning system coupled to the pressure source piston to position the pressure source piston in the pressure source cylinder.

14. The invention of claim 8 wherein each of the shock absorbers further comprises:

a reservoir:

at least one additional passage interconnecting the first and second chambers; and a check valve positioned in the at least one additional passage and oriented such that movement of the piston in the cylinder in a direction opposite to the selected direction also forces the working hydraulic fluid from the first chamber through the first named passage and the adjustable valve to the reservoir.

15. The invention of claim 14 wherein the shock absorber piston comprises a piston rod which passes through the first chamber.

16. The invention of claim 15 wherein the at least one additional passage is disposed in the shock absorber piston.

17. An adjustable shock absorber for a vehicle comprising:

a cylinder:

a piston disposed in the cylinder to define first and second chambers on opposite sides thereof at least one passage interconnecting the first and second chambers such that movement of the piston in the cylinder in a selected direction forces a working hydraulic fluid from the first to the second chambers through the passage;

means for adjustably controlling fluid flow restriction characteristics of the passage to determine a damping characteristic of the shock absorber; and fluid powered actuator means, coupled to the controlling means and configured to be connected to a control fluid circuit, for adjusting the controlling means and therefore the damping characteristic of the shock absorber in response to pressure of the control fluid circuit.

18. An adjustable shock absorber for a vehicle comprising:

a cylinder;

a piston disposed in the cylinder to define first and second chambers on opposite sides thereof;

a reservoir:

at least one passage interconnecting the first and second chambers and the reservoir such that movement of the piston in the cylinder in a selected direction forces a working hydraulic fluid from the first chamber through the passage to at least one of the reservoir and the second chamber;

means for adjustably controlling fluid flow restriction characteristics of the passage to determine a damping characteristic of the shock absorber and fluid powered actuator means, coupled to the controlling means and configured to be connected to a control fluid circuit for adjusting the controlling means and therefore the damping characteristic of the shock absorber in response to pressure of the control fluid circuit.

19. The invention of claim 17 or 18 wherein the actuator means comprises an actuator element which is biased along an actuating axis by the control fluid circuit.

20. The invention of claim 19 wherein the adjustably controlling means comprises a tapered passage flow restriction valve coupled to the actuator element to move with the actuator element such that movement of the actuator element along the actuating axis adjusts the position of the tapered passage flow restriction valve and therefore the restriction to fluid flow provided by the tapered passage flow restriction valve.

21. The invention of claim 19 wherein the adjustably controlling means comprises a blow off valve and a spring interposed between the blow off valve and the actuator element such that the position of the actuator element along the actuating axis adjusts the force applied by the spring to the blow off valve tending to hold the blow off valve closed.

22. The invention of claim 20 wherein the adjustably controlling means further comprises a blow off valve and a spring interposed between the blow off valve and the actuator element such that the position of the actuator element along the actuating axis adjusts the force applied by the spring to the blow off valve tending to hold the blow off valve closed.

23. The invention of claim 17 further comprising:

a reservoir;

at least one additional passage interconnecting the first and second chambers; and a check valve positioned in the at least one additional passage and oriented such that movement of the shock absorber piston in the cylinder in a direction opposite to the selected direction also forces the working hydraulic fluid from the first chamber through the first named passage and the adjustably controlling means to the reservoir.

24. The invention of claim 23 wherein the shock absorber piston comprises a piston rod which passes through the first chamber.

25. The invention of claim 24 wherein the at least one additional passage is disposed in the shock absorber piston.

26. An adjustable hydraulic shock absorber for a vehicle comprising:

a cylinder;

a piston disposed in the cylinder to define first and second chambers on opposite sides thereof;

at least one passage interconnecting the first and second chambers such that movement of the piston in the cylinder in a selected direction forces a working hydraulic fluid from the first to the second chambers through the passage;

an adjustable valve disposed in the passage and effective to determine a damping characteristic of the shock absorber:

a fluid powered actuator configured to be connected to a control fluid circuit and coupled to the adjustable valve, said actuator effective to adjust the valve and therefore the damping characteristic of the shock absorber in response to pressure of the control fluid circuit;

said cylinder and piston configured for mounting between suspension components of a vehicle.

27. An adjustable hydraulic shock absorber for a vehicle comprising:

a cylinder;

a piston disposed in the cylinder to define first and second chambers on opposite sides thereof;

a reservoir;

at least one passage interconnecting the first and second chambers and the reservoir such that movement of the piston in the cylinder in a selected direction forces a working hydraulic fluid from the first chamber through the passage to at least one of the reservoir and the second chamber;

an adjustable valve disposed in the passage and effective to determine a damping characteristic of the shock absorber;

a fluid powered actuator configured to be connected to a control fluid circuit and coupled to the adjustable valve, said actuator effective to adjust the valve and therefore the damping characteristic of the shock absorber in response to pressure of the control fluid circuit;

said cylinder and piston configured for mounting between suspension components of a vehicle.

28. The invention of claim 26 or 27 wherein the actuator comprises an actuator element which is biased along an actuating axis by the control fluid circuit.

29. The invention of claim 28 wherein the adjustable valve comprises a tapered passage flow restriction valve coupled to the actuator element to move with the actuator element such that movement of the actuator element along the actuating axis adjusts the position of the tapered passage flow restriction valve and therefore the restriction to fluid flow provided by the tapered passage flow restriction valve.

30. The invention of claim 28 wherein the adjustable valve comprises a blow off valve and a spring interposed between the blow off valve and the actuator element such that the position of the actuator element along the actuating axis adjusts the force applied by the spring to the blow off valve tending to hold the blow off valve closed.

31. The invention of claim 29 wherein the adjustable valve further comprises a blow off valve and a spring interposed between the blow off valve and the actuator element such that the position of the actuator element along the actuating axis adjusts the force applied by the spring to the blow off valve tending to hold the blow off valve closed.

32. The invention of claim 26 further comprising:

a reservoir;

at least one additional passage interconnecting the first and second chambers; and a check valve positioned in the at least one additional passage and oriented such that movement of the shock absorber piston in the cylinder in a direction opposite to the selected direction also forces the working hydraulic fluid from the first chamber through the first named passage and the adjustable valve to the reservoir.

33. The invention of claim 32 wherein the shock absorber piston comprises a piston rod which passes through the first chamber.

34. The invention of claim 33 wherein the at least one additional passage is disposed in the shock absorber piston.

* * * * *

REEXAMINATION CERTIFICATE (1862nd)
United States Patent
[11] B1 4,838,394

Lemme et al.

[45] Certificate Issued Dec. 1, 1992

[54] ADJUSTABLE SHOCK ABSORBER AND SYSTEM

[76] Inventors: Charles D. Lemme, 820 N. Igo Way, Tucson, Ariz. 85710; Fredrick J. Furrer, W12464 Boots Rd., Wisconsin Dells, Wis. 53965

Reexamination Request:
No. 90/002,395, Jul. 31, 1991

Reexamination Certificate for:
Patent No.: 4,838,394
Issued: Jun. 13, 1989
Appl. No.: 241,119
Filed: Sep. 6, 1988

[51] Int. Cl.$^5$ .............................................. F16F 9/46
[52] U.S. Cl. ................................... 188/299; 188/282; 188/314; 188/316; 188/318; 188/322.14; 280/714; 280/840
[58] Field of Search ............. 188/299, 282, 311-322.22, 188/280, 281, 285, 284, 286; 280/840, 714, 707, 709; 267/64.11-64.28, 186, 187, 183

[56] References Cited

U.S. PATENT DOCUMENTS

| | | |
|---|---|---|
| 1,828,446 | 10/1931 | Rossman . |
| 1,921,025 | 8/1933 | Fox . |
| 1,929,791 | 10/1933 | Peo . |
| 1,954,196 | 4/1934 | Breer et al. . |
| 2,001,460 | 8/1935 | Snyder . |
| 2,035,954 | 3/1936 | Focht . |
| 2,067,281 | 1/1937 | Padgett . |
| 2,087,548 | 7/1937 | Pitt . |
| 2,365,892 | 12/1944 | McLeod . |
| 2,592,656 | 4/1952 | Catranis . |
| 2,698,068 | 12/1954 | Hein . |
| 2,718,285 | 9/1955 | Largay, Jr. . |
| 2,950,785 | 8/1960 | Patriquin . |
| 3,040,841 | 6/1962 | Schulze . |
| 3,146,862 | 9/1964 | Van Winsen . |
| 3,256,960 | 6/1966 | Casimir . |
| 3,395,725 | 8/1968 | Roach . |
| 3,795,291 | 3/1974 | Naito et al. . |
| 3,945,626 | 3/1976 | Tilkens . |
| 3,991,863 | 11/1976 | Lee . |
| 4,052,088 | 10/1977 | Nicholls . |
| 4,122,923 | 10/1978 | Ellis et al. . |
| 4,123,859 | 11/1978 | de Koning . |
| 4,164,274 | 8/1979 | Schupner . |
| 4,561,524 | 11/1985 | Mizumukai et al. . |
| 4,566,718 | 1/1986 | Kanai et al. . |
| 4,591,186 | 5/1986 | Ashiba . |
| 4,600,215 | 7/1986 | Kuroki et al. . |
| 4,616,810 | 10/1986 | Richardson et al. . |
| 4,620,619 | 11/1986 | Emura et al. . |
| 4,647,069 | 3/1987 | Iijima . |
| 4,650,042 | 3/1987 | Knecht et al. . |
| 4,709,779 | 12/1987 | Takehara . |
| 4,752,062 | 6/1988 | Domenchini ................ 267/186 |
| 4,753,328 | 6/1988 | Williams et al. . |
| 4,802,561 | 2/1989 | Knecht et al. . |
| 4,834,088 | 5/1989 | Jeanson ................ 188/281 X |
| 4,850,460 | 7/1989 | Knecht et al. . |
| 4,880,086 | 11/1989 | Knecht et al. . |

FOREIGN PATENT DOCUMENTS

| | | |
|---|---|---|
| 154382 | 12/1953 | Australia . |
| 0229310 | 7/1987 | European Pat. Off. . |
| 1455903 | 9/1965 | Fed. Rep. of Germany . |
| 1580582 | 1/1966 | Fed. Rep. of Germany . |

OTHER PUBLICATIONS

Drawing "Gabriel Adjustomatic Shock Absorber" Figures 1 and 2—(undated).

"A Novel Valve for Semi-Active Vehicle Suspension Systems" by G. A. Parker and K. S. Lau, *I. Mech. E.*, 1988 (pp. 69-74).

"Shopping for Shocks Part II", Fredrick James Furrer, Motor Trend, Feb. 1977, pp. 82-89.

Article "Instantly Adjustable SPAX Shock Absorbers", SPAX Limited London, U.K.

*Primary Examiner*—Douglas C. Butler

[57] ABSTRACT

An adjustable shock absorber system includes a plurality of shock absorbers, the damping characteristics of which are controlled by a hydraulic control circuit. Each of the shock absorbers includes an adjustable flow restrictor that is controlled by a hydraulic actuator responsive to pressure in the control circuit. By adjusting pressure in the control circuit the damping characteristics of each of the shock absorbers can be adjusted in parallel.

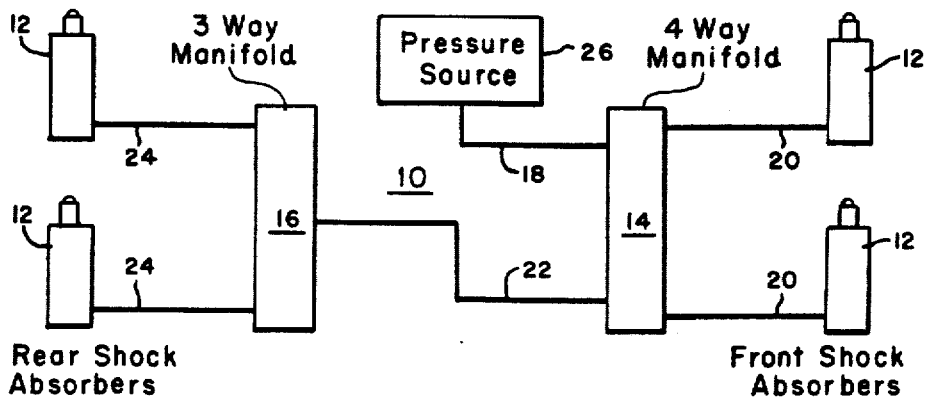

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 8, 9, 13–18, 23, 26 and 27 are cancelled.

Claims 2, 5–7, 10, 19, 21, 24, 28, 30, 31 and 32 are determined to be patentable as amended.

Claims 3, 4, 11, 12, 20, 22, 25, 29, 33 and 34, dependent on an amended claim, are determined to be patentable.

New claims 35–71 are added and determined to be patentable.

2. The invention of claim [1] *38* wherein each of the fluid powered actuator means comprises a respective actuator piston.

5. The invention of claim [1] *37* wherein the pressure adjusting means comprises:
   a cylinder in fluid communication with the control circuit;
   a piston disposed in the cylinder; and
   a manually controllable positioning system coupled to the piston to position the piston in the cylinder.

6. The invention of claim [1] *35* wherein each of the shock absorbers is operative to pass fluid through the respective passage in [the same] *a single* flow direction in response to both elongation and shortening of the *respective* shock absorber.

7. The invention of claim 6 wherein each shock absorber defines a principal flow restriction at the *respective* controlling means during both elongation and shortening of the *respective* shock absorber.

10. The invention of claim [8 or 9] *44* wherein each of the actuators comprises a respective actuator element movably mounted to respond to fluid pressure in the control circuit.

19. The invention of claim [17 or 18] *37* wherein [the actuator means comprises an] *each* actuator element [which] is biased along an actuating axis by the control fluid circuit.

21. The invention of claim 19 wherein the adjustably controlling means comprises a blow off valve and a spring interposed between the blow off valve and the actuator element such that the position of the actuator element along the actuating axis adjusts [the] *a* force applied by the spring to the blow off valve tending to hold the blow off valve closed.

24. The invention of claim [23] *49* wherein the shock absorber piston comprises a piston rod which passes through the first chamber.

28. The invention of claim [26 or 27] *45* wherein [the actuator comprises an] *each* actuator element [which] is biased along an actuating axis by the control fluid circuit.

30. The invention of claim 28 wherein the adjustable valve comprises a blow off valve and a spring interposed between the blow off valve and the actuator element such that the position of the actuator element along the actuating axis adjusts [the] *a* force applied by the spring to the blow off valve tending to hold the blow off valve closed.

31. The invention of claim 29 wherein the adjustable valve further comprises a blow off valve and a spring interposed between the blow off valve and the actuator element such that the position of the actuator element along the actuating axis adjusts [the] *a* force applied by the spring to the blow off valve tending to hold the blow off valve closed.

32. The invention of claim [26] *44* further comprising:
   a reservoir;
   at least one additional passage interconnecting the first and second chambers; and
   a check valve positioned in the at least one additional passage and oriented such that movement of the shock absorber piston in the cylinder in a direction opposite to the selected direction also forces the working hydraulic fluid from the first chamber through the first named passage and the adjustable valve to the reservoir.

*35. The invention of claim 1:*
   *wherein each of the controlling means comprises a flow metering valve member coupled to the respective actuator means such that the respective actuator means adjustably positions the flow metering valve member and therefore the restriction to fluid flow provided by the flow metering valve member;*
   *wherein each of the controlling means additionally comprises a spring and a blow off valve coupled to the respective actuator means by the spring such that control fluid circuit pressure on the respective actuator means adjusts a force tending to hold the blow off valve closed; and*
   *wherein the flow metering valve member extends upstream of the blow off valve to transmit forces resulting from pressure within the respective shock absorber to the actuator means and thereby to increase control fluid circuit pressure during both elongation and shortening of the respective shock absorber.*

*36. The invention of claim 1:*
   *wherein each of the controlling means comprises a blow off valve comprising a valve plate coupled to the respective actuator means such that control fluid circuit pressure on the respective actuator means adjusts a force tending to hold the blow off valve plate closed;*
   *wherein each of the valve plates defines a central aperture and each of the controlling means comprises a flow metering valve member slidably positioned in the central aperture and coupled to the respective actuator means such that the respective actuator means adjustably positions the flow metering valve member in the respective valve plate, thereby adjusting the restriction to fluid flow provided by the flow metering valve member;*
   *said actuator means and controlling means configured such that fluid pressure within one of the shock absorbers that opens the respective blow off valve moves the actuator means associated with the opened blow off valve outwardly, thereby increasing pressure in the* control fluid circuit during both elongation and shortening of said one of the shock absorbers.

37. The invention of claim 1 wherein each of the shock absorbers comprises a restrictor plate disposed in the respective passage.

38. The invention of claim 1:
wherein each of the actuator means comprises a respective actuator element having first and second opposed sides;
wherein pressure of the control fluid circuit is applied to the first opposed side; and
wherein means are provided for venting a region adjacent the second opposed side.

39. The invention of claim 38 wherein the venting means vents the region adjacent the second opposed side via a passage extending outside the shock absorber.

40. The invention of claim 39 wherein the venting means vents the region adjacent the second opposed side to atmosphere.

41. The invention of claim 8 or 9:
wherein each shock absorber is operative to pass fluid through the respective at least one passage and the respective adjustable valve in a single direction during both elongation and shortening of the respective shock absorber;
wherein each adjustable valve comprises both a blow off valve and a flow metering valve; and
wherein each fluid powered actuator is operative to adjust both the blow off valve and the flow metering valve of the associated adjustable valve.

42. The invention of claim 8 or 9:
wherein each adjustable valve comprises a flow metering valve member coupled to the respective actuator such that the respective actuator adjustably positions the flow metering valve member and therefore the restriction to fluid flow provided by the flow metering valve member;
wherein each adjustable valve additionally comprises a spring and a blow off valve coupled to the respective actuator by the spring such that control fluid circuit pressure on the associated actuator adjusts a force tending to hold the blow off valve closed; and
wherein the flow metering valve member extends upstream of the blow off valve to transmit forces resulting from pressure within the respective shock absorber to the respective actuator and thereby to increase pressure in the control fluid circuit during both elongation and shortening of the respective shock absorber.

43. The invention of claim 8 or 9:
wherein each of the adjustable valves comprises a blow off valve comprising a valve plate coupled to the respective actuator such that control fluid pressure on the respective actuator adjusts a force tending to hold the blow off valve plate closed;
wherein each of the blow off valve plates defines a central aperture and each of the adjustable valves comprises a flow metering valve member slidably positioned in the central aperture and coupled to the respective actuator such that the respective actuator adjustably positions the flow metering valve member in the respective valve plate, thereby adjusting the restriction to fluid flow provided by the flow metering valve member;
said actuators and adjustable valves configured such that fluid pressure within one of the shock absorbers that opens the respective blow off valve moves the actuator associated with the opened blow off valve outwardly, thereby increasing pressure in the control fluid circuit during both elongation and shortening of said one of the shock absorbers.

44. The invention of claim 8 or 9 wherein each of the shock absorbers comprises a restrictor plate disposed in the respective passage.

45. The invention of claim 26 or 27:
wherein the actuator comprises an actuator element having first and second opposed sides;
wherein control fluid circuit pressure is applied to the first opposed side; and
wherein means are provided for venting a region adjacent the second opposed side.

46. The invention of claim 45 wherein the venting means vents the region adjacent the second opposed side via a passage extending outside the shock absorber.

47. The invention of claim 46 wherein the venting means vents the region adjacent the second opposed side to atmosphere.

48. The invention of claim 9 wherein the adjustable valve is disposed in a valve chamber, and wherein the valve chamber is in direct fluid communication both with the reservoir and with one of the first and second chambers.

49. The invention of claim 23 wherein the controlling means comprises both a blow off valve and a flow metering valve, and wherein the fluid powered actuator means is operative to adjust both the blow off valve and the flow metering valve.

50. The invention of claim 17 or 18:
wherein the controlling means comprises a flow metering valve member coupled to the actuator means such that the actuator means adjustably positions the flow metering valve member and therefore the restriction to fluid flow provided by the flow metering valve member;
wherein the controlling means additionally comprises a spring and a blow off valve coupled to the actuator means by the spring such that control fluid circuit pressure on the actuator means adjusts a force tending to hold the blow off valve closed; and
wherein the flow metering valve member extends upstream of the blow off valve to transmit forces resulting from pressure within the shock absorber to the actuator means and thereby to increase control fluid circuit pressure during both elongation and shortening of the shock absorber.

51. The invention of claim 50 wherein the shock absorber is operative to pass fluid through the at least one passage in the same flow direction in response to both elongation and shortening of the shock absorber.

52. The invention of claim 51 wherein the shock absorber defines a principal flow restriction at the controlling means during both elongation and shortening of the shock absorber.

53. The invention of claim 17 or 18:
wherein the actuator means comprises an actuator element having first and second opposed sides;
wherein pressure of the control fluid circuit is applied to the first opposed side; and
wherein means are provided for venting a region adjacent the second opposed side.

54. The invention of claim 53 wherein the fluid powered actuator means comprises an actuator piston.

55. The invention of claim 54 wherein the controlling means comprises a flow metering valve member secured to the actuator piston to move with the actuator piston.

56. The invention of claim 54 wherein the controlling means comprises:
a blow off valve; and a compression spring interposed between the blow off valve and the actuator piston such that the spring provides a biasing force tending to seat the blow off valve and the biasing force is variable as a function of the position of the actuator piston.

57. The invention of claim 53 wherein the actuator element is biased along an actuating axis by the control fluid circuit.

58. The invention of claim 17 or 18 wherein the shock absorber comprises a restrictor plate disposed in the passage, wherein the actuator means comprises an actuator element movably mounted to respond to fluid pressure in the control fluid circuit, and wherein the means for adjustably controlling fluid flow restriction characteristics comprises:

a blow off valve; and a compression spring interposed between the blow off valve and the actuator element such that the spring provides a biasing force tending to seat the blow off valve and the biasing force is variable as a function of the position of the actuator element.

59. The invention of claim 26 or 27 wherein the shock absorber comprises a restrictor plate disposed in the passage, wherein the actuator comprises an actuator element movably mounted to respond to fluid pressure in the control fluid circuit, and wherein the adjustable valve comprises:

a blow off valve; and a compression spring interposed between the blow off valve and the actuator element such that the spring provides a biasing force tending to seat the blow off valve and the biasing force is variable as a function of the position of the actuator element.

60. The invention of claim 59 wherein the adjustable valve comprises a tapered passage flow metering element secured to the actuator element to move with the actuator element.

61. The invention of claim 27 wherein the adjustable valve is disposed in a valve chamber, wherein the valve chamber is in direct fluid communication both with the reservoir and with one of the first and second chambers, wherein the actuator comprises an actuator element movably mounted to respond to fluid pressure in the control circuit, and wherein the adjustable valve comprises:

a blow off valve; and a compression spring interposed between the blow off valve and the actuator element such that the spring provides a biasing force tending to seat the blow off valve and the biasing force is variable as a function of the position of the actuator element.

62. The invention of claim 26 or 27:

wherein the shock absorber is operative to pass fluid through the at least one passage and the adjustable valve in a single direction during both elongation and shortening of the shock absorber;

wherein the adjustable valve comprises both a blow off valve and a flow metering valve; and wherein the fluid powered actuator is operative to adjust both the blow off valve and the flow metering valve of the adjustable valve.

63. The invention of claim 26 or 27:

wherein the adjustable valve comprises a flow metering valve member coupled to the actuator such that the actuator adjustably positions the flow metering valve member and therefore the restriction to fluid flow provided by the flow metering valve member;

wherein the adjustable valve additionally comprises a spring and a blow off valve coupled to the actuator by the spring such that control fluid circuit pressure on the actuator adjusts a force tending to hold the blow off valve closed; and wherein the flow metering valve member extends upstream of the blow off valve to transmit forces resulting from pressure within the shock absorber to the actuator and thereby to increase pressure in the control fluid circuit during both elongation and shortening of the shock absorber.

64. The invention of claim 57 wherein the adjustably controlling means comprises a tapered passage flow restriction valve coupled to the actuator element to move with the actuator element such that movement of the actuator element along the actuating axis adjusts the position of the tapered passage flow restriction valve and therefore the restriction to fluid flow provided by the tapered passage flow restriction valve.

65. The invention of claim 57 wherein the adjustably controlling means comprises a blow off valve and a spring interposed between the blow off valve and the actuator element such that the position of the actuator element along the actuating axis adjusts a force applied by the spring to the blow off valve tending to hold the blow off valve closed.

66. The invention of claim 64 wherein the adjustably controlling means further comprises a blow off valve and a spring interposed between the blow off valve and the actuator element such that the position of the actuator element along the actuating axis adjusts a force applied by the spring to the blow off valve tending to hold the blow off valve closed.

67. The invention of claim 59 further comprising:

a reservoir;

at least one additional passage interconnecting the first and second chambers; and a check valve positioned in the at least one additional passage and oriented such that movement of the shock absorber piston in the cylinder in a direction opposite to the selected direction also forces the working hydraulic fluid from the first chamber through the first named passage and the adjustable valve to the reservoir.

68. The invention of claim 67 wherein the shock absorber piston comprises a piston rod which passes through the first chamber.

69. The invention of claim 68 wherein the at least one additional passage is disposed in the shock absorber piston.

70. The invention of claim 55 wherein the venting means vents the region adjacent the second opposed side via a passage extending outside the shock absorber.

71. The invention of claim 70 wherein the venting means vents the region adjacent the second opposed side to atmosphere.

* * * * *